(12) United States Patent
Schiwietz et al.

(10) Patent No.: US 7,952,595 B2
(45) Date of Patent: May 31, 2011

(54) IMAGE DEFORMATION USING PHYSICAL MODELS

(75) Inventors: Thomas Schiwietz, Munich (DE); Joachim Georgii, Ismaning (DE); Rudiger Westermann, Karlsfeld (DE)

(73) Assignee: Technische Universität München, München ( * ) Notice: Subject to any disclaimer, the term of this patent is extended or adjusted under 35 U.S.C. 154(b) by 850 days.

(21) Appl. No.: 11/975,065

(22) Filed: Oct. 17, 2007

(65) Prior Publication Data

US 2008/0192049 A1 Aug. 14, 2008

Related U.S. Application Data

(60) Provisional application No. 60/889,657, filed on Feb. 13, 2007.

(51) Int. Cl.
G09G 5/00 (2006.01)
(52) U.S. Cl. ......... 345/647; 345/619; 345/660; 345/649
(58) Field of Classification Search .................. None
See application file for complete search history.

(56) References Cited

U.S. PATENT DOCUMENTS

| | | | | |
|---|---|---|---|---|
| 6,277,074 | B1 * | 8/2001 | Chaturvedi et al. | 600/437 |
| 6,608,631 | B1 * | 8/2003 | Milliron | 345/647 |
| 6,748,112 | B1 * | 6/2004 | Nguyen et al. | 382/203 |
| 6,958,752 | B2 * | 10/2005 | Jennings et al. | 345/420 |
| 7,236,170 | B2 * | 6/2007 | Sepulveda | 345/423 |
| 7,239,992 | B2 * | 7/2007 | Ayache et al. | 703/11 |
| 7,286,127 | B2 * | 10/2007 | Zhou et al. | 345/420 |
| 7,710,415 | B2 * | 5/2010 | Jennings et al. | 345/420 |
| 2002/0089500 | A1 * | 7/2002 | Jennings et al. | 345/420 |
| 2002/0183992 | A1 * | 12/2002 | Ayache et al. | 703/2 |
| 2003/0206183 | A1 * | 11/2003 | Silverstein | 345/647 |
| 2004/0056871 | A1 * | 3/2004 | Milliron | 345/647 |
| 2005/0231510 | A1 * | 10/2005 | Santos | 345/473 |
| 2006/0290693 | A1 * | 12/2006 | Zhou et al. | 345/420 |
| 2008/0043021 | A1 * | 2/2008 | Huang et al. | 345/428 |
| 2008/0143711 | A1 * | 6/2008 | Zhou et al. | 345/420 |
| 2008/0143724 | A1 * | 6/2008 | Russakoff | 345/441 |

OTHER PUBLICATIONS

M. Alexa, D. Cohen-Or, and D. Levin. As-rigid-as-possible shape interpolation. In SIGGRAPH '00: Proceedings of the 27th annual conference on Computer graphics and interactive techniques, pp. 157-164, New York, NY, USA, 2000. ACM Press/Addison-Wesley Publishing Co.

T. Beier and S. Neely. Feature-based image metamorphosis. In SIGGRAPH '92: Proceedings of the 19th annual conference on Computer graphics and interactive techniques, pp. 35-42, New York, NY, USA, 1992. ACM Press.

J. Bolz, I. Farmer, E. Grinspun, and P. Schröder. Sparse matrix solvers on the GPU: Conjugate gradients and multigrid In Proc. SIGGRAPH '03, pp. 917-924, 2003.

F. L. Bookstein. Principal warps: Thin-plate splines and the decomposition of deformations. IEEE Trans. Pattern Anal. Mach. Intell., 11(6):567-585, 1989.

(Continued)

*Primary Examiner* — M Good Johnson
(74) *Attorney, Agent, or Firm* — Donald B. Paschburg; F. Chau & Associates, LLC

(57) ABSTRACT

A method for deforming an image using a physical model includes inputting the image, discretizing the image into a grid, applying forces to the grid upon receiving an input command for dragging the grid, updating a mesh deformation of the grid according to the forces, and wrapping the image according to a deformed mesh to produce a deformed image, wherein a wrapped image is displayed on an display device.

23 Claims, 2 Drawing Sheets

OTHER PUBLICATIONS

M. Botsch, M. Pauly, M. Wicke, and M. Gross. Adaptive space deformations based on rigid cells. In Proceedings of Eurographics 2007, 2007.

M. Bro-Nielsen and S. Cotin. Real-time volumetric deformable models for surgery simulation using finite elements and condensation. In Proc. Eurographics, 1996.

R. Gal, O. Sorkine, and D. Cohen-Or. Feature-aware texturing. In Proceedings of Eurographics Symposium on Rendering, Abstract, 2006.

L. Grady and G. Funka-Lea. Multi-label image segmentation for medical applications based on graph-theoretic electrical potentials. In ECCV 2004 Workshops CVAMIA and MMBIA, pp. 230-245, 2004.

L. Grady, T. Schiwietz, S.Ahron, and R.Westermann. Random walks for interactive alpha-matting. In Proceedings of the Fifth IASTED International Conference on Visualization, Imaging and Image Processing, pp. 423-429, Benidorm, Spain, Sep. 2005. ACTA Press.

J. Huang, X. Shi, X. Liu, K. Zhou, L.-Y. Wei, S.-H. Teng, H. Bao, B. Guo, and H.-Y. Shum. Subspace gradient domain mesh deformation. ACM Trans. Graph., 25(3):1126-1134, 2006.

T. Igarashi, T. Moscovich, and J. F. Hughes. As-rigid-as possible shape manipulation. In SIGGRAPH '05: ACM SIGGRAPH 2005 Papers, pp. 1134-1141, New York, NY, USA, 2005. ACM Press.

J. Kruger and R. Westermann. Linear algebra operators for GPU implementation of numerical algorithms. ACM Trans. Graph., 22(3):908-916, 2003.

S.-Y. Lee, K.-Y. Chwa, and S. Y. Shin. Image metamorphosis using snakes and free-form deformations. In SIGGRAPH '95: Proceedings of the 22nd annual conference on Computer graphics and interactive techniques, pp. 439-448, New York, NY, USA, 1995. ACM Press.

M. Muller, J. Dorsey, L. McMillan, R. Jagnow, and B. Cutler. Stable real-time deformations. In ACM SIGGRAPH/EG symp. on Computer animation '02, 2002.

J. F. 'Brien and J. K. Hodgins. Graphical modeling and animation of brittle fracture. In Proc. SIGGRAPH'99, 1999.

S. Schaefer, T. McPhail, and J. Warren. Image deformation using moving least squares. In SIGGRAPH '06: ACM SIGGRAph 2006 Papers, pp. 533-540, New York, NY, USA, 2006. ACM Press.

L. Shi, Y. Yu, N. Bell, and W.-W. Feng. A fast multigrid algorithm for mesh deformation. ACM Trans. Graph., 25(3):1108-1117, 2006.

O. Sorkine, D. Cohen-Or, Y. Lipman, M. Alexa, C. Rössl, and H.-P. Seidel. Laplacian Surface editing. In SGP '04: Proceedings of the 2004 Eurographics/ACM SIGGRAPH symposium on Geometry processing, pp. 175-184, New York, NY, USA, 2004. ACM Press.

Y. Weng, W. Xu, Y. Wu, K. Zhou, and B. Guo. 2D shape deformation using nonlinear least squares optimization. Vis. Comput., 22(9):653-660, 2006.

J. Georgii and R. Westermann. A multigrid framework for real-time simulation of deformable volumes. In Workshop On Virtual Reality Interaction and Physical Simulation, 2005.

\* cited by examiner

IMAGE DEFORMATION USING PHYSICAL MODELS

CROSS-REFERENCE TO RELATED APPLICATION

This application claims priority to U.S. Provisional Application Ser. No. 60/889,657, filed on Feb. 13, 2007, which is herein incorporated by reference in their entirety.

BACKGROUND OF THE INVENTION

1. Technical Field

The present invention relates to deforming images, and more particularly to a system and method for deforming images using physical models.

2. Discussion of Related Art

As-rigid-as-possible image deformations produce intuitive results when a user wants to manually control the shape deformation of an image. As-rigid-as-possible transformations, introduced for the purpose of shape interpolation, are characterized by a minimum amount of scaling and shearing. Such transformations mimic the adaptation of the mechanical properties (e.g., the stiffness) of the transformation to enforce rigidity.

In the context of image deformation as-rigid-as-possible transformations have been introduced to avoid undesirable effects like folding and non-uniform scaling typically perceived in previous methods. The particular properties of as-rigid-as-possible transformations have been enforced by minimizing the distortion of triangular elements in a 2D mesh. By separating the rotational part from the scaling the problem is decomposed into the solution of two least squares problems. In principle, this technique can be seen as a variant of constraint mesh deformation techniques, which pose the problem of shape deformation as an energy minimization problem. Such techniques have been used successfully for shape-preserving 3D mesh deformation, and in the context of image deformation.

The idea of shape-preserving deformations has been built upon using a rotation invariant shape representation constraint by a set of angles and lengths relating a vertex to its immediate neighbors. Another method for inhomogeneous texture mapping is based on a classification of cells into rigid and elastic. Determining the global displacement field can then be posed as an optimization problem that takes into account the specific cell properties as additional constraints.

Although as-rigid-as-possible transformations are well suited for the purpose of shape preservation they are not effective at following physics-based constraints like volume preservation or elastic deformations. As images are typically composed of parts, it is often desired to continuously adjust the stiffness of the transformation to permit larger displacements over parts that are known to be compliant and smaller displacements over parts that are known to be less compliant.

Therefore, a need exists for an efficient image deformation method using physical models together with as-rigid-as-possible transformations.

SUMMARY OF THE INVENTION

According to an embodiment of the present disclosure, a method for deforming an image using a physical model includes inputting the image, discretizing the image into a grid, applying forces to the grid upon receiving an input command for dragging the grid, updating a mesh deformation of the grid according to the forces, and warping the image according to a deformed mesh to produce a deformed image, wherein a warped image is displayed on an display device.

According to an embodiment of the present disclosure, a system for deforming an image using a physical model includes a memory device storing a plurality of instructions embodying the system for deforming an image using a physical model and a processor for receiving an image and executing the plurality of instructions to perform a method comprising discretizing the image into a grid, applying forces to the grid upon receiving an input command for dragging the grid, updating a mesh deformation of the grid according to the forces, and warping the image according to a deformed mesh to produce a deformed image.

BRIEF DESCRIPTION OF THE DRAWINGS

Preferred embodiments of the present invention will be described below in more detail, with reference to the accompanying drawings.

DETAILED DESCRIPTION OF EXEMPLARY EMBODIMENTS

Figure 1A:
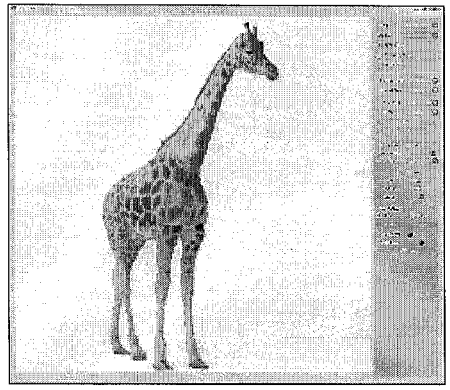
FIGS. 1A-D are exemplary views of a user interface for deforming an image according to an embodiment of the present disclosure.
Figure 1B:
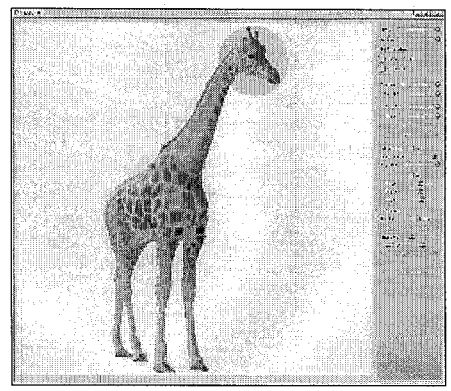
Figure 1C:
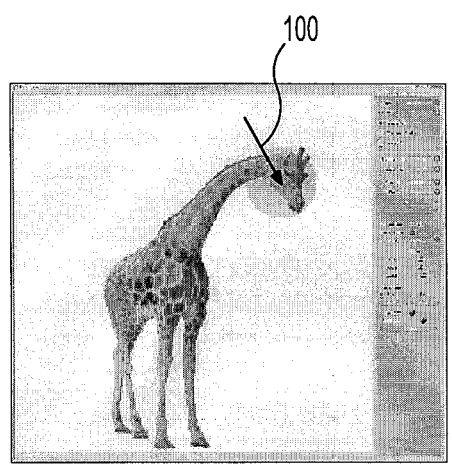

According to an embodiment of the present disclosure, image deformation using physically-based deformation models allows for the assignment of material stiffness on a per-pixel basis. On top of image deformation, a stiffness editor, a depth editor, a cut editor, and a key frame animation system allowing the user to record movies from a single image may be implemented.

Physically-correct deformation models may be applied to images in real-time using simulation engines having multi-grid solvers.

According to an embodiment of the present disclosure, by using the multi-grid solvers, material stiffness can be simulated realistically by assigning stiffness to each finite element of the simulation grid. Thus, material properties and tissue properties can be simulated realistically. Further, a user can drag any point in the image and drag it to a desired target location. The user does not need to set handles on the deformation mesh. Additionally, linear and non-linear simulation types, finite elements, physically correct and as-rigid-as-possible deformation constraints can be used and exchanged interactively for different kinds of deformation results.

Referring to a physics-based deformation according to an embodiment of the present disclosure, a linear elasticity model is implemented with additional constraints are enforced to mimic plasticity, as an elastic material to resist a change in shape. For the linear elasticity model, it is assumed that the image is to be represented as a 2D triangular grid, where exactly one grid point is placed at each pixel center. Grid points are then connected to their one-ring neighbors via edges. Given such a grid in the reference configuration $x \in \Omega$, the deformed grid is modeled using a displacement function $u(x), u: \mathbb{R}^2 \rightarrow \mathbb{R}^2$ yielding the deformed configuration $x+u(x)$.

Triangular finite elements may be replaced by quadrangular elements to further an optimization.

If the object to be simulated obeys to the model of linear elasticity the dynamic behavior is governed by the Lagrangian equation of motion $$M\ddot{u} + C\dot{u} + Ku = f \quad (1)$$

where M, C, and K are respectively known as the mass, damping and stiffness matrices. u includes the linearized displacement vectors of all vertices and f are the linearized force vectors applied to each vertex. These vectors are either computed from mouse drags issued by the user or they are taken from pre-computed force templates as described below. The linear elasticity model only considers material that has a linear relationship between how hard it is squeezed or torn (stress) and how much it deforms (strain). This relationship is expressed by the material law, based on which the per-element contributions to the global stiffness matrix K are computed.

Equipped with any suitable discretization, finite element methods build the aforementioned matrices by assembling all element matrices to yield a sparse system of linear equations.

For numerical simulation, multi-grid methods provide a generalized means for constructing customized solvers for partial differential equations, and they give rise to scalable solvers exhibiting linear complexity in the number of supporting vertices. At the core of any geometric multi-grid scheme a hierarchy of meshes at different resolutions is employed. In a multi-grid V-cycle specific quantities are transferred across this hierarchy from fine to coarse and coarse to fine. Using the regular grid structures employed in this work, such a hierarchy can easily be built by regularly sub-sampling the grid vertices and connecting these vertices as described above. While vertex quantities are simply interpolated when going from the coarser to the finer resolution, the inverse step from fine to coarse essentially averages over the quantities at respective vertices in the fine mesh.

Here, an implicit multi-grid solver for image deformations is amenable to the simulation of heterogeneous materials exhibiting a wide range of stiffness values. The lack of rotational invariants of the linear approximation of the strain tensor, which results in artificial forces once elements get rotated out of their reference configuration is addressed using co-rotated finite elements integrated into the multi-grid method.

According to an embodiment of the present disclosure, a physics-based finite element simulation is extended to account for the particular needs in image deformation. One example of an extension is a modified material law that enables as-rigid-as-possible transformations. Additional exemplary extensions include algorithms to efficiently handle material updates and to fixate simulation vertices without sacrificing speed.

Referring to the material laws; the stiffness matrix K accounts for the strain and stress energy, and it depends on the material laws and parameters used to couple stress and strain. In an isotropic and fully elastic body stress ($\Sigma$) and strain ($\epsilon$) tensors are coupled through Hooke's law (linear material law)

$$\sum = \frac{Ev}{(1+v)(1-2V)}\left(\sum_{i=1}^{2}\varepsilon_{ii}\right) \cdot I_{22} + \frac{E}{1+v}\varepsilon, \quad (2)$$

where E is the elastic modulus, v is the Poisson ratio and $I_{22}$ is the identity matrix.

Shape deformations obeying Hooke's law are often not desired when manipulating images. Especially volume preservation as it is enforced by Hookes law is a physical phenomenon that contradicts shape preserving as-rigid-as-possible deformations.

Volume preservation, on the other hand, can be avoided by prohibiting transversal contractions of the material being deformed. This is achieved by appropriately varying the Poisson ratio v in equation 2, which defines the ratio of transverse contraction to longitudinal stretching in the direction of the force. In particular, v is set to 0, thus also avoiding any curvature in a direction perpendicular to the direction of stretching or bending.

To enable as-rigid-as-possible transformations, the physical simulation is enforced to respect an anisotropic material law. By doing so, the user is able to flexibly control the resulting deformations by continuously varying between rigid and highly elastic materials within one image. The anisotropic material law is simulated by adding a scaling factor $\alpha$ for the off-diagonal elements in the stress tensor, yielding the rigid material law $$\sum = E\begin{pmatrix} \varepsilon_{11} & \alpha\varepsilon_{12} \\ \alpha\varepsilon_{21} & \varepsilon_{22} \end{pmatrix} \quad (3)$$

The modified material law allows for transformations minimizing the amount of shearing or rotation, respectively, and it can thus effectively be used to produce as-rigid-as-possible transformations. For a value of $\alpha=1$ the material law is isotropic. By decreasing the value of $\alpha$ the internal stress is reduced into the direction of $x_2$ if strain is induced into the direction of $x_1$, and vice versa. Consequently, such a setting favors shearing instead of rotation. Contrarily, by setting $\alpha$ to a value larger than 1 rotations instead of shearing will be favored. Note, that typically the rigid material law does not preserve volume. However, a larger value of $\alpha$ leads to volume growth if shearing forces are applied, while small values of $\alpha$ tend to preserve volume in this case.

To improve simulation accuracy quadrangular finite elements have been integrated with bi-linear nodal basis functions into the multi-grid approach. Quadrangular elements include 4 supporting vertices $v_k$, thus interpolating the deformation in the interior as $$u(x) = \sum_{k=0}^{3} N_k(x) u_k \quad (4)$$

where $$N_k(x) = c_0^k + c_1^k x_1 + c_2^k x_2 + c_3^k x_1 x_2.$$

$u_k$ is the displacement of the k-th vertex, and the coefficients $c_i^k$ are derived from $N_k(v_k)=1$ and $N_k(v_i)=0$ if $k \neq i$. From the definition of the nodal basis functions as given the element matrices with respect to their reference configuration can now be pre-computed.

By using quadrangular elements the following beneficial properties are achieved. The overall number of elements is significantly reduced, resulting in a faster assembly of the global system matrix for systems in which the system matrix is reassembled in every simulation frame. Semi-quadratic interpolation as supported by quadrangular elements improves the deformation behavior by increasing simulation accuracy.

In image deformation, the user does not typically expect the image to move back into its reference configuration once the control handles are released. To avoid this behavior forces induced by the user are accumulated into a global force field, and the resulting displacements of grid points are computed just at the very end of the user interaction. This is advantageous because in order to account for the plasticity the system matrix does not have to be updated. Instead, we consider the linear system of equations in the form $$K(u_{plastic}+u)=f_{plastic}+f$$

where $Ku_{plastic}=f_{plastic}$ are the plastic deformations computed so far, and f are the forces applied by the current user input.

For an image deformation tool according to an embodiment of the present disclosure that provides flexibly control for the deformation of different parts of the image, specific stiffness values are assigned to parts of the image. These values may be assigned interactively while the simulation is running, the simulation method reacts on such changes.

It can be observed that element matrices do not have to be rebuilt if only the stiffness E of a single finite element is to be changed. This is because in equation (2) and (3) $\Sigma$ is a multiple of E, and thus E can be factored out of the element matrix. This means that the element matrix only has to be scaled by the factor $E_{new}/E_{old}$, which can be performed in the reassembly of the global stiffness matrix at no additional cost.

A segmentation algorithm is used for assigning specific properties to parts of an image. It should be noted that it is possible to assign these properties using a painting tool on a per-pixel basis. The image segmentation algorithm assigns the properties on a per-object basis. The segmentation algorithm extracts objects from the image automatically by single mouse clicks or strokes on top of the object. Once the object's boundaries are found the interior is filled with a user-defined property.

Since stiffness is a quantity used to adjust the deformation behavior, and thus the kind of transformation performed, the segmentation algorithms assign stiffness to parts of an image. By using an interactive segmentation algorithm stiffness can be assigned to objects in a single mouse click. The real-time segmentation algorithm we describe below even enables on-the-fly stiffness assignment during the deformation process, and it can thus be used flexibly to interactively control the resulting deformations. In addition, segmentation is used to select mesh vertices within particular image regions that should be fixed and to establish a rendering order of mesh elements by assigning object-specific depth values.

Any segmentation algorithm can be used for each of the aforementioned tasks. Of these, non-binary segmentation algorithms are useful since the segmentation results yield a smooth transition between the segmented object and the background. For a stiffness assignment, the segmentation result can be mapped directly to stiffness using a transfer function. In this way, abrupt stiffness changes can be avoided in the simulation grid at no extra cost.

The Random Walker algorithm is an example of an algorithm that falls into the category of non-binary segmentation algorithms. It is fast, easy to implement on the GPU and numerically stable.

The Random Walker algorithm is started on an image that contains a number of seed pixels indicating the object to segment. Given a random walker starting at every other pixel, the probability that this walker reaches one of the seeded pixels is computed. The probability that a random walker travels into a particular direction is determined by the image structure. The change in pixel intensity is a measure for the probability by which a random walker crosses over to a neighboring pixel. Therefore, there is a high likelihood for a random walker to move inside the segmented object, but low likelihood to cross the object's boundary. By multiplying probabilities computed along the paths from pixels to seed points yields a probability distribution representing a non-binary segmentation.

To use the Random Walker algorithm on color images we first convert RGB pixel values in the image to intensity values. Pixel values are first transformed to the Lab color space and the Euclidian length of the Lab vector length is used as intensity. Next, a function to express the probability is defined to map changes in image intensities to crossing weights.

The principle idea is to express random walks by a system of linear equations instead of simulating the random walks itself. With the seed points as boundary conditions the problem can be posed as the solution of a sparse, symmetric, positive-definite system of linear equations.

To make this solution fast, and thus to enable the use of the Random Walker in real-time applications, numerical GPU-solvers can be used. A GPU conjugate gradient method may be used that enables segmentation of high-resolution images within milliseconds.

Figure 1D:
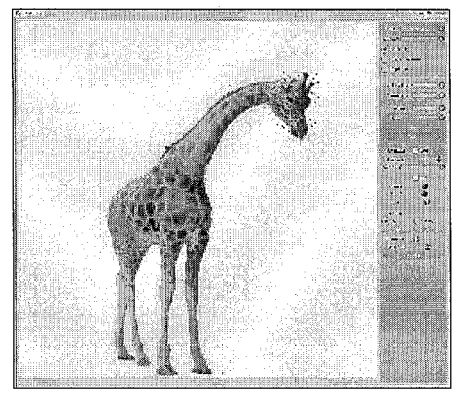

Referring now to FIGS. 1A-D and a user interface for a system and method for image deformation using physical models, a user loads an image to deform FIG. 1A. By mouse clicking the image at an arbitrary point FIG. 1B, the point follows the mouse movement as long as the mouse button is pressed FIG. 1C. This allows dragging points/areas/objects to new places in the photograph FIGS. 1B-D. The arrow 100 indicates the origin and target drag motion. In FIG. 1D note, how the dragged area remains stiff while the background deforms.

Figure 2:
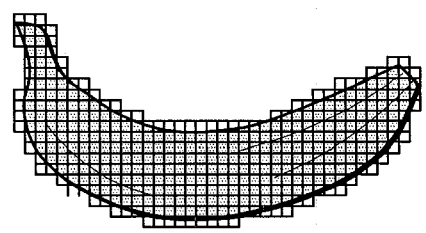
FIG. 2 is an exemplary view of a user interface displaying an image discretized into finite elements according to an embodiment of the present disclosure.

FIG. 2 illustrates the grid of finite elements.

A paint-and-fill interface may be used to assign stiffness, fixation, depth, etc. to an image. The interface allows painting these properties on top of the image using different brush sizes. As users typically prefer to assign properties on a per-object basis, the segmentation algorithm is built into the interface and can then be used to segment objects from a single mouse click. Upon segmentation, default or selected parameter values are assigned to respective image structures.

Figure 3:
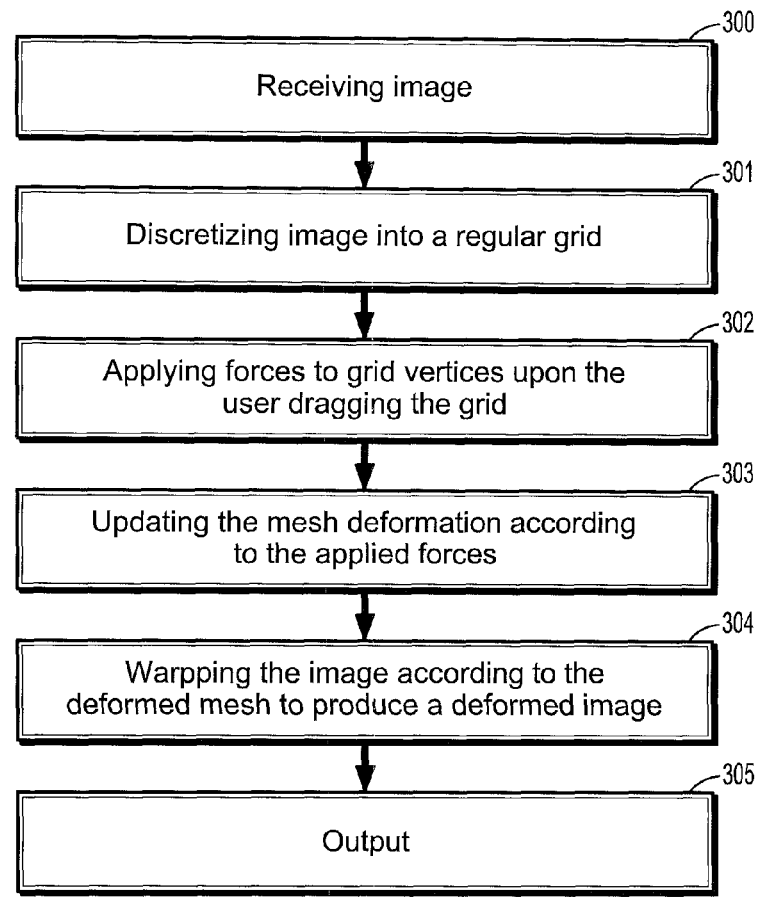
FIG. 3 is a flow chart of a method for image deformation using physical models according to an embodiment of the present disclosure.

Referring to FIG. 3 and a method for image deformation; an input image 300 is discretized into a regular grid for the simulation/deformation engine 301. Forces to grid vertices are applied upon the user dragging the grid 302. The physically-based simulation engine updates the mesh deformation according to the applied forces 303. The rendering engine warps the image according to the deformed mesh 304. The warped image is output to, for example, a display device, a memory device, etc.

Once all image properties are set the image is deformed using mouse drags. Therefore, the vertex is determined in the simulation grid closest to the mouse position. From the direction and strength of the mouse drag we derive a force vector to be applied to the vertex. By using, for example, the mouse wheel, the user can generate a radially expanded force field of arbitrary extend. It can be selected whether forces should decay smoothly with increasing distance to the center vertex or should be constant within the selected region. The direction of the force field is everywhere identical to the force applied to the center vertex.

Deformations on a per-object basis can be achieved using on-the-fly segmentations for image deformations. Besides the assignment of properties to parts of an image in a pre-process, the Random Walker is employed as a tool for on-the-fly parameter assignment. In this way, the user can flexibly select objects and move them around while the surroundings deform accordingly. On-the-fly assignment starts once the user clicks the initial drag point. Substantially instantaneously, the segmentation algorithm considers the cell of the simulation grid that contains this point as a seed point for the Random Walker. The segmentation is then performed on the undeformed simulation grid, thereby assigning stiffness values to the segmented object. After the stiffness values are downloaded to the simulation engine, which updates the system matrices, the user starts dragging the picked object while the background deforms. Note that by applying soft stiffness to the picked object, local object deformations are possible.

According to an embodiment of the present disclosure, a stiffness editor can be implemented wherein stiffness can be assigned to each finite element separately. This allows realistic deformations by using real-world tissue stiffness.

A cut editor may be used to separate foreground objects from the background. Finite elements in the background are removed from the simulation grid. This way, artificial deformations without disturbing effect from the background can be achieved.

A depth editor may be implemented which allows the user to assign depth values on a per pixel basis. Depth information is important as soon as the deformed image overlaps itself. The depth values determine what is in front and what is in the back.

According to an embodiment of the present disclosure, animations can be created from image deformations by saving key frames of the force field using a key frame editor. The key frame playback interpolates the force fields and runs the deformation engine to get the warped image.

It should be noted that embodiments of the present disclosure may be used in various applications for various images. For example, embodiments are not limited to a specific types of image like photographs, painting, medical images, sensor images, etc.

Further, embodiments of the present disclosure can be applied to medical images, since the simulation engine supports the assignment of real-world stiffness properties on a per-pixel (and even sub-pixel) basis. Therefore, with the knowledge of the stiffness properties in a medical image, applying forces by mouse drags to a medical image results in a realistic behavior of organ deformations. The manual image registration is one application.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 4:
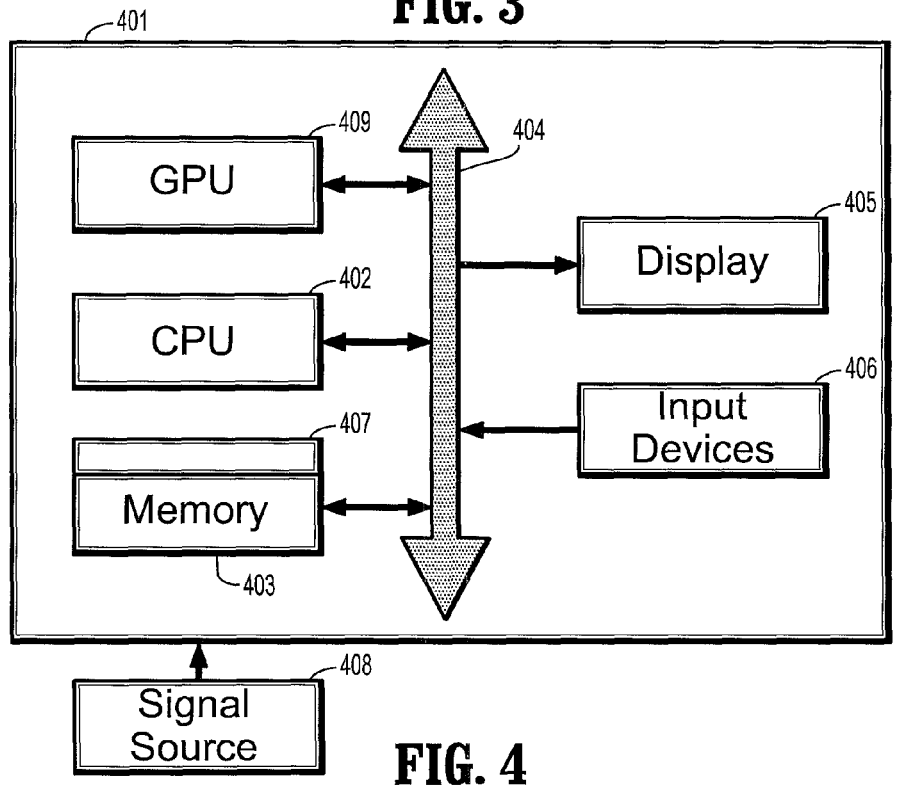
FIG. 4 is a diagram of a system according to an embodiment of the present disclosure.

Referring to FIG. 4, according to an embodiment of the present invention, a computer system 401 for deforming images using physical models comprise, inter alia, a central processing unit (CPU) 402, a memory 403 and an input/output (I/O) interface 404. The computer system 401 is generally coupled through the I/O interface 404 to a display 405 and various input devices 406 such as a mouse and keyboard. The support circuits can include circuits such as cache, power supplies, clock circuits, and a communications bus. The memory 403 can include random access memory (RAM), read only memory (ROM), disk drive, tape drive, etc., or a combination thereof. The present invention can be implemented as a routine 407 that is stored in memory 403 and executed by the CPU 402 to process a signal, e.g., a closed surface mesh, from the signal source 408. As such, the computer system 401 is a general purpose computer system that becomes a specific purpose computer system when executing the routine 407 of the present invention. The computer system 401 may further include a GPU 409 for processing certain operations.

The computer platform 401 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for a system and method for deforming images using physical models, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer readable medium embodying instructions executable by a processor to perform a method for deforming an image using a physical model, the method comprising:
    inputting the image;
    discretizing the image into a grid;
    applying forces to the grid upon receiving an input command for dragging the grid;
    assigning off-diagonal elements in a stress tensor of the forces a corresponding scaling factor, wherein the corresponding scaling factor favors one of shearing and rotation;
    updating a mesh deformation of the grid according to the forces; and
    warping the image according to a deformed mesh to produce a deformed image, wherein a warped image is displayed on an display device.

2. The method of claim 1, wherein the grid is a plurality of triangles, where exactly one grid point is placed at each triangle center and grid points are connected to one-ring neighbors via edges.

3. The method of claim 1, wherein the grid is a plurality of quadrangular finite elements integrated with bi-linear nodal basis functions into a multi-grid approach.

4. The method of claim 1, further comprising assigning different parts of the image specific stiffness values.

5. The method of claim 1, further comprising segmenting an object of interest from the image, and filling the object of interest with a user-defined property.

6. The method of claim 5, wherein the user-defined property is at least one of a stiffness, fixation, and depth value.

7. The method of claim 5, wherein the user-defined property is assigned on a per-object basis.

8. The method of claim 1, wherein the input command is a mouse click and drag, wherein the click selects a point and the point follows the drag to an arbitrary point.

9. The method of claim 1, further comprising selecting an extent of a radially expanded force field associated with the forces.

10. A system for deforming an image using a physical model comprising:
   a memory device storing a plurality of instructions embodying the system for deforming an image using a physical model; and
   a processor for receiving an image and executing the plurality of instructions to perform a method comprising:
      discretizing the image into a grid;
      applying forces to the grid upon receiving an input command for dragging the grid;
      assigning off-diagonal elements in a stress tensor of the forces a corresponding scaling factor, wherein the corresponding scaling factor favors one of shearing and rotation
      updating a mesh deformation of the grid according to the forces; and
      warping the image according to a deformed mesh to produce a deformed image.

11. The system of claim 10, wherein the grid is a plurality of triangles stored in the memory device, where exactly one grid point is placed at each triangle center and grid points are connected to one-ring neighbors via edges.

12. The system of claim 10, wherein the grid is a plurality of quadrangular finite elements stored in the memory device and integrated with bi-linear nodal basis functions into a multi-grid approach.

13. The system of claim 10, further comprising assigning different parts of the image specific stiffness values.

14. The system of claim 10, further comprising segmenting an object of interest from the image, and filling the object of interest with a user-defined property, wherein the user-defined property is at least one of a stiffness, fixation, and depth value.

15. The system of claim 14, wherein the user-defined property is assigned on a per-object basis.

16. The system of claim 10, further comprising an input device for selecting a point on the grid wherein the point follows the drag of the input device to an arbitrary point.

17. The system of claim 10, further comprising an input device for selecting an extent of a radially expanded force field associated with the forces.

18. A computer readable medium embodying instructions executable by a processor to perform a method for deforming an image using a physical model, the method comprising:
   inputting the image;
   discreditizing the image into a grid;
   segmenting an object of interest from the image, and filling the object of interest with a user-defined property, wherein the user-defined property is at least one of a stiffness, fixation, and depth value mapped to a portion of the grid corresponding to the objection of interest;
   applying forces to the grid upon receiving an input command for dragging the grid;
   updating a mesh deformation of the grid according to the forces and the user-defined property; and
   warpping the image according to a deformed mesh to produce a deformed image, wherein a wrapped image is displayed on an display device.

19. The method of claim 18, wherein the grid is a plurality of triangles, where exactly one grid point is placed at each triangle center and grid points are connected to one-ring neighbors via edges.

20. The method of claim 18, wherein the grid is a plurality of quadrangular finite elements integrated with bi-linear nodal basis functions into a multi-grid approach.

21. The method of claim 18, further comprising assigning different parts of the image specific stiffness values.

22. The method of claim 18, wherein the input command is a mouse click and drag, wherein the click selects a point and the point follows the drag to an arbitrary point.

23. The method of claim 18, further comprising selecting an extent of a radially expanded force field associated with the forces.

* * * * *